United States Patent
Benkreira et al.

(10) Patent No.: US 10,452,897 B1
(45) Date of Patent: Oct. 22, 2019

(54) SYSTEM FOR VERIFYING THE IDENTITY OF A USER

(71) Applicant: Capital One Services, LLC, McLean, VA (US)

(72) Inventors: Abdelkader M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/055,986

(22) Filed: Aug. 6, 2018

(51) Int. Cl.
    G06K 9/00 (2006.01)
    G06F 21/00 (2013.01)
    G06F 21/32 (2013.01)

(52) U.S. Cl.
    CPC ......... *G06K 9/00288* (2013.01); *G06F 21/32* (2013.01); *G06K 9/00456* (2013.01); *G06K 9/00469* (2013.01); *G06K 9/00906* (2013.01)

(58) Field of Classification Search
    CPC ........... G06K 9/00288; G06K 9/00456; G06K 9/00469; G06K 9/00906; G06F 21/32
    See application file for complete search history.

(56) References Cited

U.S. PATENT DOCUMENTS

| | | | | | |
|---|---|---|---|---|---|
| 6,045,039 | A | * | 4/2000 | Stinson | G06Q 20/18 235/379 |
| 2014/0363057 | A1 | * | 12/2014 | Eckel | G06F 21/32 382/116 |
| 2015/0078671 | A1 | * | 3/2015 | van Deventer | G06K 9/00463 382/217 |
| 2016/0071101 | A1 | | 3/2016 | Winarski | |
| 2016/0104041 | A1 | * | 4/2016 | Bowers | G06K 9/00483 382/115 |
| 2017/0237731 | A1 | | 8/2017 | Ganesan | |
| 2017/0351909 | A1 | * | 12/2017 | Kaehler | G06K 9/00281 |

(Continued)

OTHER PUBLICATIONS

AWS DeepLens, "Deep Learning Enabled Video Camera for Developers", Retrieved from the Internet on May 31, 2018: https://aws.amazon.com/deeplens/, pp. 1-14.

(Continued)

*Primary Examiner* — David F Dunphy
(74) *Attorney, Agent, or Firm* — Greenberg Traurig, LLP

(57) ABSTRACT

A system receives an image including a live facial image of the user and an identity document including a photograph of the user. Moreover, the system calculates a facial match score by comparing facial features in the live facial image to facial features in the photograph. The system recognizes data objects and characters in the identity document using optical character recognition (OCR) and computer vision, and then identifies, based on the recognized data objects and characters, a type of the identity document. Further, the system calculates a document validity score by comparing the recognized characters and data objects to character strings and data objects known to be present in the identified type of the identity document. Additionally, the system determines and outputs the user's identity verification status based on comparing the facial match score to a facial match threshold and comparing the document validity score to a document validity threshold.

20 Claims, 8 Drawing Sheets

(56) References Cited

U.S. PATENT DOCUMENTS

2018/0089499 A1* 3/2018 Sun .................. G06K 9/00288
2018/0124047 A1 5/2018 Fisher et al.

OTHER PUBLICATIONS

Coinbase, "Identity Verification", Retrieved from the Internet on Jun. 1, 2018: https://support.coinbase.com/customer/en/portal/articles/1220621-identify-verification, pp. 1-7.

Coinbase, "Photo ID Verification", Retrieved from the Internet on Jun. 1, 2018: https://support.coinbase.com/customer/en/portal/articles/2909433-photo-id-verification, pp. 1-4.

Devpost, "OneEye", Retrieved from the Internet on May 31, 2018: https://devpost.com/software/oneeye-fdtnuk#updates, pp. 1-10.

* cited by examiner

SYSTEM FOR VERIFYING THE IDENTITY OF A USER

TECHNICAL FIELD

This disclosure relates to verifying a user's identity, and more particularly, to verifying a user's proof-of-identity based on an image of the user that includes a live facial image of the user and an identity document with a photograph of the user.

BACKGROUND

Traditionally, signing up for certain financial and government services requires a person to visit a physical location of a financial or government institution in order to verify the person's identity. For example, activities such as enrolling in a school or establishing a bank account require a potential student or customer to visit the school or bank branch in-person so that the school or bank can verify the identity of the student or customer. This proof-of-identity needed to enroll in such services traditionally requires in-person verification and an identity document (e.g., a photo ID such as a driver's license or passport). That is, a user must be physically present while establishing accounts for such services.

Mobile devices (e.g., smartphones), kiosks, and automated teller machines (ATM) are electronic devices that include cameras, telecommunications subsystems, and interactive user interfaces. For example, an ATM enables customers of financial institutions to perform financial transactions, such as cash withdrawals, deposits, fund transfers, and account information inquiries, at all hours and without the need for direct interaction with bank staff. Accordingly, ATMs provide a convenient and accessible mechanism for providing services to a user. With the advent of online banking and the availability of mobiles devices, users are accustomed to a high degree of convenience including the ability to access various financial and government services from computerized devices. However, ATMs have traditionally been limited to performing specialized functions relating exclusively to providing banking services for existing customers. Conventional ATMs are underutilized in light of their potential abilities and existing equipment, including components and peripherals (e.g., a camera) that are currently limited to usage by existing account holders. New customers cannot sign up for accounts without visiting a bank branch during business hours so that the bank can verify their identity. Accordingly, it would be desirable to utilize the abilities and functionalities of mobile devices, ATMs, and other camera-equipped devices for the benefit of verifying the identity of new customers.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

Figure 1:
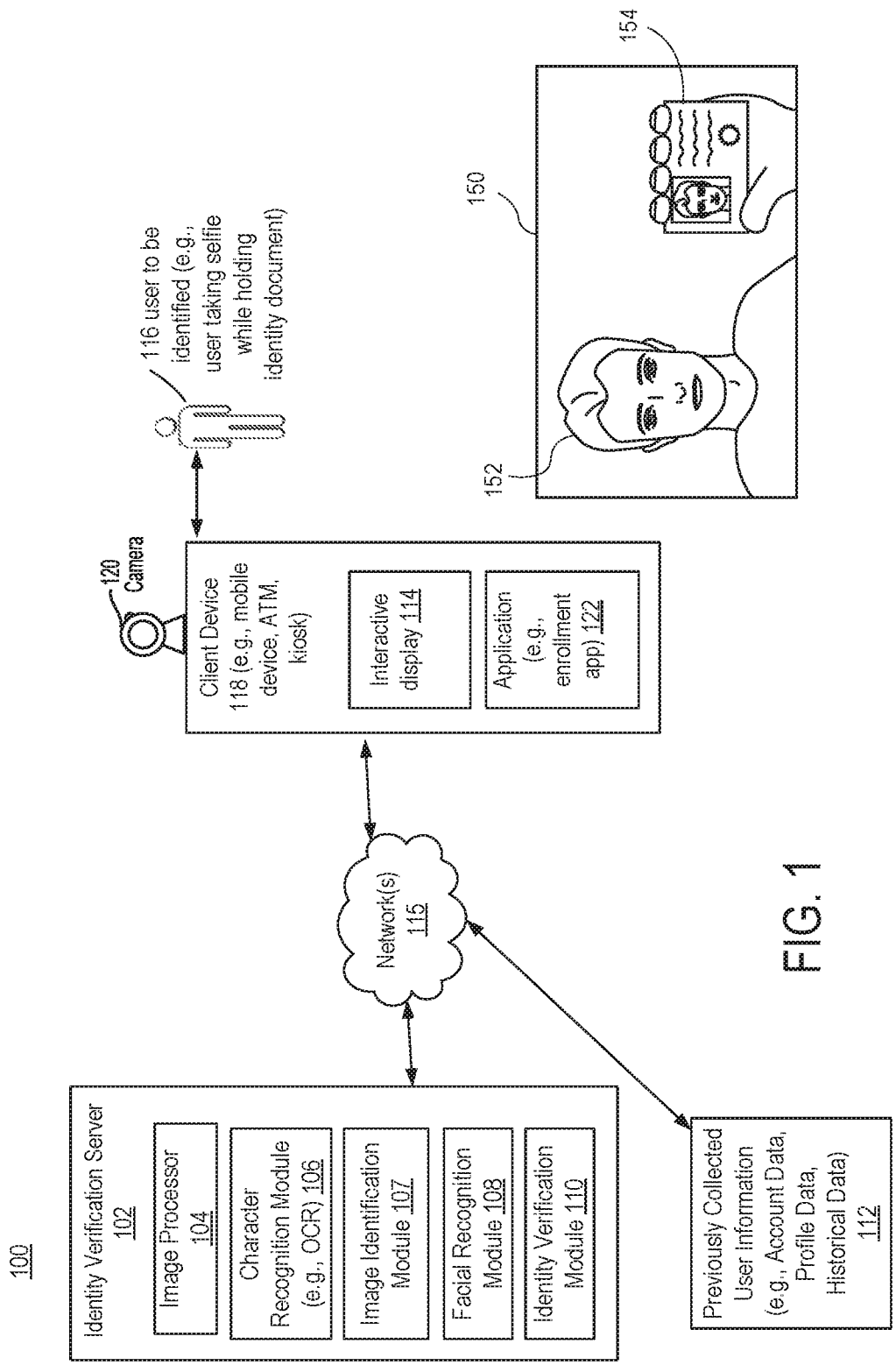
FIG. 1 is a block diagram illustrating an example of an operating environment for verifying the identity of a user according to one or more implementations of the disclosure.

Various implementations and aspects of the disclosures will be described with reference to details discussed below, and the accompanying drawings will illustrate the various implementations. The following description and drawings are illustrative of the disclosure and are not to be construed as limiting the disclosure. Numerous specific details are described to provide a thorough understanding of various implementations of the present disclosure. However, in certain instances, well-known or conventional details are not described in order to provide a concise discussion of implementations of the present disclosure.

Reference in the specification to "one implementation" or "an implementation" or "some implementations," means that a particular feature, structure, or characteristic described in conjunction with the implementation can be included in at least one implementation of the disclosure. The appearances of the phrase "implementation" in various places in the specification do not necessarily all refer to the same implementation.

The present disclosure is generally related to facial recognition information processing, and, more specifically, to methods, apparatuses, and computer program products for processing facial recognition information obtained from an image that includes: 1) a live (e.g., in the flesh) facial image of a user whose identity is to be verified, and 2) an identity document that has a photograph of the user (e.g., a photo ID associated with the user). Implementations of the methods, apparatuses, and computer program products disclosed herein provide for verification of a user's identity based on using facial recognition and an image including a live facial image of the user and an identity document with a photograph of the user. The facial recognition is used to determine whether the live facial image of the user matches the photograph of the user. As such, implementations consistent with the present disclosure provide a particular, technically advantageous computer architecture that improves security for user transactions, including financial transactions such as establishing bank accounts, fund withdrawals, and fund transfers. In certain implementations, an identity verification server or system may be used for verifying the identity of a new or existing customer of a financial entity (e.g., a bank customer) in order to permit the customer to complete a transaction. For example, the identity verification system may use a camera of an ATM to capture an image including a live facial image of a user holding a photo ID in order to verify a bank customer's identity to permit a transaction at that ATM. As such, implementations consistent with the present disclosure provide a particular, technically advantageous system to reduce the instance of fraud associated with financial transactions and improve security when verifying a user. Some implementations consistent with the present disclosure leverage the wide-spread use of mobile personal communication devices (e.g., smart phones with integrated cameras) to facilitate identity verification of users. For example, a financial entity, a government agency, or a third party may provide a downloadable software application to the user to install on their mobile communication device, where the software application is designed to prompt the user to provide a proof-of-identity in the form of an image including a live facial image of the user (e.g., a selfie) while holding in the selfie frame an identity document that includes a photograph of the user's face.

In some implementations, described is a system (and method) for verifying the identity of a user based on an image that includes both a live facial image of the user (e.g., a digital image or a selfie taken with a camera of a mobile device or an image of the user in the flesh captured by an ATM camera) and an identity document including a photograph of the user. The system uses the image to verify the user's identity without requiring the user to be physically present at a location. The system may allow for the verification of a user's identity based on an image including: 1) a live facial image of the user, and 2) an identity document that has a photograph of the user. For example, upon receiving the image that includes both the live facial image of the user and the identity document with a photograph of the user, a financial entity (e.g., a financial institution) or a government entity (e.g., a government agency or school) utilizing the techniques described here may verify the user's identity without requiring the user to be present at a physical location of the financial or government entity. Accordingly, the system described in some implementations of the disclosure provides a secure mechanism for allowing a financial institution or a government organization to provide users with the benefits of proving their identity without requiring the users to visit physical locations such as bank branches or government offices.

In some implementations, a system receives an image including a live facial image of the user and an identity document including a photograph of the user. For example, the identity document may be a driver's license, a passport, a student identification card, an employee identification, or a national identity card. In some implementations, the identity document may be any photo ID that includes a photograph of the user and some secondary indication of the user's identity (i.e., secondary characteristics). For example, the secondary indications or characteristics may be one or more of a name, address, date of birth, height, weight, employee identification number, student identification number, driver's license number, passport number, national identity number, national insurance number, or the like. According to these examples, the identity document need not be a government-issued ID. Moreover, the system calculates a facial match score by comparing facial features in the live facial image to facial features in the photograph from the identity document. In some implementations, the system recognizes images and other identifiers present in the portion of the image containing the identity document using computer vision techniques. In an implementation, the system also recognizes characters in the portion of the image containing the identity document by performing optical character recognition (OCR), and then identifies, by parsing the recognized characters, the user's secondary characteristics. Further, the system calculates a document validity score by comparing the secondary characteristics to user profile data for the user retrieved from a data store. Additionally, the system determines, based on comparing the facial match score to a predetermined facial match threshold and comparing the document validity score to a predetermined document validity threshold, an identity verification status of the user. Also, the system may present the identity verification status.

Described are systems and techniques for verifying a user's identity. In some implementations, systems and techniques implement various facial recognition, character recognition, and machine learning techniques to verify a user's identity based on an image that includes a live facial image of the user and an identity document including a photograph of the user (e.g., a selfie of a user taken while the user is holding a photo ID that is visible in the frame of the selfie).

In one aspect of the disclosure, described is a system that receives an image including a live facial image of the user (e.g., a selfie) and an identity document including a photograph of the user (e.g., a photo ID). Moreover, the system calculates a facial match score by comparing facial features in the live facial image to facial features in the photograph. The system recognizes data objects and characters in the identity document by performing optical character recognition (OCR) and computer vision tasks. The system then identifies, based on the recognized data objects and parsing the recognized characters, a type of the identity document. Further, the system calculates a document validity score by comparing the recognized characters and data objects to character strings and data objects known to be present in the identified type of the identity document. Additionally, the system determines, based on comparing the facial match score to a predetermined facial match threshold and comparing the document validity score to a predetermined document validity threshold, an identity verification status of the user. Also, the system outputs the identity verification status.

In another aspect of the disclosure, described is a system that may verify a user's identity by receiving an image, the image including a live facial image of a user and an identity document that includes a photograph of the user. The system calculates a facial match score by comparing facial features in the live facial image to facial features in the photograph. Additionally, the system recognizes characters in the identity document by performing OCR. The system also identifies, by parsing the recognized characters, secondary characteristics of the user and then calculates a document validity score by comparing the secondary characteristics to user profile data for the user retrieved from a data store. Further, the system determines, based on comparing the facial match score to a predetermined facial match threshold and comparing the document validity score to a predetermined document validity threshold, an identity verification status of the user. The system then presents, on a display device, the identity verification status.

In yet another aspect of the disclosure, described is a system that receives an image including a live facial image of a user holding an identity document that includes a photograph of the user. The system then calculates a facial match score by comparing facial features extracted from the live facial image to facial features extracted from the photograph. Also, the system recognizes data objects in the identity document based on performing optical character recognition (OCR) and computer vision tasks. Next, the system identifies, based on the recognized data objects, a type of the identity document. Moreover, they system calculates a document validity score by comparing the recognized data objects to security features present in the identified type of the identity document. Furthermore, the system verifies, based on the facial match score exceeding a predetermined facial match threshold and the document validity score exceeding a predetermined document validity threshold, the identity of the user. Lastly, the system outputs an indication of the verified identity of the user.

In one implementation, an account enrollment application resident on a mobile device, a wall-mounted device, or an ATM or may utilize a camera, an interactive user interface, and location information provided by the mobile device, ATM, or wall-mounted device. For example, an enrollment application (or "app") may interact with or access a Global Positioning System (GPS) component, an embedded touchscreen display, and a camera (e.g., a webcam or integrated camera) to prompt a user to take a live, in-the-flesh picture of their face (commonly referred to as a 'selfie') while holding in the selfie frame an identity document that includes a photograph of the user's face. The enrollment app may be resident of a variety of mobile computing devices (e.g., tablets and smartphones), wall-mounted computing devices (e.g., interactive displays with integrated cameras), customer service kiosks, table-mounted computing devices with webcams, and ATMs. For instance, the application (e.g., enrollment app) may obtain a user selfie including an image of the user's identity document from an ATM, via the ATM's camera, and transmit that selfie to an identity verification system in response to receiving an enrollment request. Upon obtaining such a selfie image from the ATM, the identity verification system may perform facial recognition and other operations to verify the identity of the requesting user at the ATM.

FIG. 1 is a block diagram illustrating an example of an operating environment for verifying the identity of a user according to one or more implementations of the disclosure. As shown, the operating environment 100 may include one or more systems including an identity verification server 102, a client device 118, a data store or system storing previously collected user information 112, and various other systems (not shown) such as banking/financial systems, which may interact via a network 115. The network 115 may be any type of wired or wireless network including a local area network (LAN), a wide area network (WAN), or a direct communication link, or other suitable connection.

The client device 118 may include an application 122 (or application software) which may include program code (or a set of instructions) that performs various operations (or methods, functions, processes, etc.) as further described herein. For example, the application may include any type of "app" such as a financial application, account enrollment application, government service application, etc. In some implementations, the application 122 enables users to sign up and apply for financial services such as bank accounts, loans, credit cards, mortgages, retirement savings accounts, brokerage accounts, mobile and online payment services (e.g., the Venmo™ and PayPal™ services from PayPal Holdings, Inc. of San Jose, Calif.), and other financial services. In other implementations, the application 122 enables users to enroll in government services such as school enrollment, voter registration, online voting, absentee voting, registering for computer based trainings or tests (such as certification exams), a national health insurance program (e.g., Medicare), social security benefits, unemployment compensation, federal student loans, the National Flood Insurance Program (NFIP), Supplemental Nutrition Assistance Program (SNAP) benefits.

In certain implementations, the application 122 is optional. For example, according to such implementations, the user 116 may be prompted to capture image 150 (e.g., a selfie 152 while holding an identity document 154) by an SMS text message, an email, or a web site interface. In accordance with these implementations, the user 116 does not have to install application 122 on the client device 118. Rather, the identity verification server 102 may prompt the user 116 to provide image 150 by indicating that a proof-of-identity is needed to complete a transaction such as, for example, creating a new account, signing up for a service, modifying an existing account, or initiating a financial transaction (e.g., a large withdrawal or fund transfer). The prompt from the identity verification server 102 may be displayed on interactive display 114 of the client device 118. In this way, the user 116 may be prompted to capture image 150 including selfie 152 while holding identity document 154 (e.g., a photo ID) without requiring the user 116 to install or execute application 122 on the client device 118.

In certain implementations, the application 122 may be an application usable to manage existing an existing account of an account holder or customer (e.g., user 116). For example, the application 122 may be usable to perform online transactions for a bank account, a brokerage account, a health savings account (HSA), a pension account, or a retirement savings account (e.g., a 401(k) or individual retirement account (IRA)). According to such implementations, the application 122 may prompt the account holder for a proof-of-identity in response to the account holder initiating or requesting certain high-risk or unusual transactions. Such a proof-of-identity prompt may be presented to the user 116 in the interactive display 114 even though the user 116 is already logged into an account using an account ID and password. For instance, the application 122 may prompt the account holder (e.g., user 116) to take a selfie with the camera 120 while holding an identity document that includes a photograph of the account holder in response to the user requesting to transfer a relatively large amount of funds out of the account.

In non-limiting examples, the prompt for a proof-of-identity may be presented in the interactive display 114 of the client device 118 in response to a request by the user 116 to transfer an amount or percentage of funds exceeding a fund threshold amount out of a financial account. In accordance with these examples, the user 116 may be prompted to take a selfie while holding their identity document when the user 116 requests to transfer more than 25% of their total account balance out of the account or when the user 116 requests to transfer out or withdraw more than $10,000.

In some implementations, sets of training data of previous account transactions from previously collected user information 112 may be used to train a machine learning model to determine what transactions are sufficiently unusual or risky to warrant prompting the user 116 for a proof-of-identity. For example a machine learning model may be trained to suggest that the fund threshold be dynamically altered (e.g., lowered or increased) based on historical patterns in past transactions initiated by the user 116. In this way, the model may be trained to output threshold transfer or withdrawal amounts deemed to be high-risk or unusual, and thus necessitating a proof-of-identity from the user 116, based on any number of different facets. For example, the model may be trained to recognize transactions falling within normal usage patterns for the user 116 based on previously collected user information 112 indicating that the user 116 typically accesses their account on weekdays during business hours and historically makes withdrawals below $2,000. In this example, if the user 116 requests a withdrawal of $20,000 at 3 AM on a Saturday, the trained machine learning model may suggest that the requested amount exceeds a fund threshold of $2,000, and the application 122 may prompt the user 116 to furnish proof-of-identity as an additional level of account security. Also, for example, the application 122 may also interact with or access a GPS component of the client device 118 to obtain location information provided by the client device 118 to assist in confirming the location of the user 116 who is initiating a withdrawal. According to some examples, previously collected data 112, which includes location information and withdrawal amounts for past financial transactions initiated by the user 116, is used to train the machine learning model to flag relatively large withdrawals made at locations far from locations normally visited by the user 116 as being unusual or high-risk. For instance, the application 122, which has been informed by the machine learning model, may prompt the user 116 via the interactive display 114 to use the camera 120 to furnish a proof-of-identity (e.g., image 150 including a selfie 152 taken while holding a photo ID 154) in response to determining that the user 116 is initiating a relatively large withdrawal far from the ATM and GPS locations that the user 116 typically visits.

In one implementation, the application 122 may be provided to the client device 118 and developed by a third-party. For example, a third-party may include an entity (e.g., company, government agency, etc.) that is different from the financial entity that may manage one or more user accounts (e.g., bank accounts) that may be accessed by a user of the client device 118. As shown in FIG. 1, the client device 118 may be a mobile device, an ATM, or a kiosk that includes a camera 120 and an interactive display 114. However, in one implementation, the application 122 may be an enrollment application provided by the financial entity or government entity itself and may interact with a third-party service or system to enroll new users. In one implementation, the enrollment application may be installed onto the operating system of the client device 118. In addition, in one implementation, an identity verification application or module (e.g., identity verification module 110) may reside (at least partially) on a remote system (e.g., identity verification server 102) with the various components (e.g., front-end components of the enrollment app) residing on the client device 118. As further described herein, the enrollment application 122 and the identity verification server 102 may perform operations (or methods, functions, processes, etc.) that may require access to one or more peripherals and modules. In the example of FIG. 1, the identity verification server 102 includes an image processor 104, a character recognition module 106, an image identification module 107, a facial recognition module 108, and an identity verification module 110.

The image processor 104 may be implemented as an application (or set of instructions) or module configured to perform operations (or methods, functions, processes, etc.) for receiving and processing an image, via the network 115, from the camera 120 of the client device 118. In some implementations, the image includes a live facial image of a user of the client device 118 and an identity document including a photograph of the user. The image processor 104 may scan the image, detect the live facial image using existing digital image processing techniques, store the live facial image (e.g., a selfie taken by the user), and detect and store the portion of the image containing the identity document (e.g., the portion of the image 150 that shows the user's photo ID 154). The image processor 104 may perform digital image processing operations or tasks on the image 150, such as feature extraction, classification, and pattern recognition. Such digital image processing operations may be performed by the image processor 104 in order to detect the portions of the image 150 that include the live facial image 152 and the identity document 154.

The character recognition module 106 may be implemented as an application (or set of instructions) or module configured to perform operations (or methods, functions, processes, etc.) for scanning and recognizing characters present in the portion of the image containing the identity document. The character recognition module 106 reads text off of the identity document as character strings and parses those strings to recognize words and numbers in the portion of the image 150 containing the identity document 154. In the non-limiting example of FIG. 1, the character recognition module 106 may be configured to perform optical character recognition (OCR) on the identity document. In this way, the character recognition module 106 may scan the identity document, recognize character strings present in the portion of the image containing the identity document, and determine user characteristics indicated in the character strings (e.g., name, address, date of birth, gender, eye color, hair color, weight, etc.).

The image identification module 107 may be implemented as an application (or set of instructions) or module configured to perform operations (or methods, functions, processes, etc.) for scanning and recognizing data objects present in the portion of the image containing the identity document. The image identification module 107 may use current computer vision techniques and algorithms to recognize images and other identifiers present in the portion of the image containing the identity document. Such computer vision techniques used by the image identification module 107 may use the results or output of digital image processing operations performed by the image processor 104. The computer vision techniques may include performing computer vision tasks such as, for example, object recognition (e.g., object classification to classify data objects found within the image 150), object identification to identify individual instances of objects (e.g., identifying data objects present in the image 150), scanning image data to detect specific conditions (e.g., scanning the image 150 to detect the presence of the live facial image 152 and the identity document 154), and image segmentation (e.g., segmenting the image 150 into portions containing the live facial image 152 and the identity document 154). In some implementations, the image identification module 107 may perform computer vision tasks such as object recognition, classification, and identification to disambiguate multiple faces (e.g., facial images) in the image 150 containing the identity document 154. For example, the image identification module 107 may be configured to work in conjunction with the facial recognition module 108 to be able to determine that an image 150 has a live facial image 152 of a user in the foreground, but another person's face in the background of the image 150 (e.g., a different person who appears in the background of the selfie).

Examples of data objects that may be visible on an identity document include security-feature objects such as watermarks, line drawings, microprinting, holograms, data-bearing objects such as quick response (QR) codes and bar codes; and the like. Some data-bearing objects included in the data objects may also be used as security features. In some implementations, the image identification module 107 scans and recognizes data objects, including images such as logos, flags, and official seals (e.g., state or government seals), that are present in the identity document 154. The image identification module 107 may parse recognized data objects in order to detect whether certain data objects are present in the portion of the image containing the identity document. The identity verification module 110 may use such detected data objects and security features to determine a type of the identity document and to calculate a document validity score by comparing the recognized characters from the user's identity document to data objects and security features present in the identified type of the identity document. For example, if the type of the identity document is determined to be a driver's license issued by a certain state, the identity verification module 110 may determine if security features (e.g., a watermark with the state seal, flag, or other identifier) known to be present in that state's driver's licenses are found in the recognized characters and objects of the user's identity document.

The facial recognition module 108 may be implemented as an application (or set of instructions) or module configured to perform operations (or methods, functions, processes, etc.) for performing facial recognition in order to verify that the live facial image (e.g., selfie) is an image of the same individual depicted in the photograph from the identity document, which is in the portion of the selfie image containing the identity document. The facial recognition module 108 may use current facial recognition techniques and algorithms that extract facial information (e.g., facial signature data) from an image, compare it to facial information extracted from another image, and determine a probability that represents whether the two images are of the same person. In example implementations, the facial recognition module 108 may use facial recognition techniques and algorithms such as, for instance, intrinsic face movement, depth mapping algorithms, neural networks, 3D sensing techniques, and texture detection. Such facial recognition techniques and algorithms can recognize and identify a particular individual in the live facial image and determine whether that individual is the same individual that is depicted in the photograph in the portion of the image containing the identity document. In one example, the facial recognition module 108 may extract facial features (e.g., facial signature data) from the live facial image 152 and from the photograph in the portion of the image 150 containing the identity document 154. In an example implementation, the facial recognition module 108 may calculate a facial match score by comparing facial features extracted from the live facial image to facial features extracted from the photograph. In another example implementation, the facial recognition module 108 could translate both the live image 152 (e.g., the selfie) and the photograph from the identity document 154 into respective topographical maps, scale the two topographical maps to be the same size, overlay the maps on top of each other, and compare the severity of differences between the maps.

The identity verification module 110 may be implemented as an application (or set of instructions) or module configured to perform operations (or methods, functions, processes, etc.) for verifying the identity of the user depicted in the live facial image.

For example, the identity verification module 110 may compare the document validity score to a predetermined, tunable, document validity threshold to determine whether the identity document is valid or not. In certain implementations, the document validity threshold may be tuned by manual adjustments (e.g., settings selected by a system administrator). In additional or alternative implementations, machine learning may be used to automatically adjust the document validity threshold over time. For example, the identity verification module 110 may train a machine learning model to automatically adjust the document validity threshold. In certain implementations, the document validity threshold may tuned both manually and automatically. For instance, to account for certain machine learning models that may have the risk of teaching themselves incorrectly, some implementations allow for manual corrections and adjustments to the document validity threshold. For example, to account for an incorrectly trained machine learning model that sets the document validity threshold too high, which results in misidentifying legitimate identity documents as being fakes or forgeries, such implementations allow a system administrator to manually reduce the document validity threshold. The document validity score may be determined in part by comparing recognized characters that have been translated into meaningful values (e.g., secondary characteristics such as name, address, height, weight, date of birth and the like), and objects found in the user's identity document to data objects and security features (e.g., watermarks, holograms, etc.) known to be present in that type of identity document (e.g., a driver's license, passport, etc.). According to some examples, such training of a machine learning model is performed using previously collected data 112. In the example of FIG. 1, the previously collected data 112 may include user account data (e.g., name and current address), profile data, and historical data for the user (e.g., past addresses and names used). In some implementations, the identity verification module 110 may check to see if the user is in a database (e.g., a black list or a grey list) of known identities that have been have compromised (e.g., stolen IDs) or that have been banned from financial activities (e.g., anti-money laundering). Such a database may be remote from or included in the previously collected data 112.

Also, for example, the identity verification module 110 may compare the facial match score calculated by the facial recognition module 108 to a predetermined, tunable, facial match threshold to determine a confidence level representing whether the individual in the live facial image is the same person depicted in the photograph in the identity document. In some implementations, the document validity score and the facial match scores may be expressed as numeric values (e.g., percentages or numbers indicating a confidence level that the identity document is valid and the person depicted in the live facial image and the photograph is the same individual). For example, a 75% facial match score may indicate that 75% of the distinguishing facial characteristics detected in the live facial image and in the photograph match. By using sets of training data of facial image pairs to train a machine learning model, the identity verification module 110 may improve identity verification results over time.

As with the document validity threshold, in certain implementations, the facial match threshold may be tuned by manual adjustments (e.g., manually set by a system administrator). In additional or alternative implementations, machine learning may be used to automatically adjust the facial match threshold over time. For instance, the identity verification module 110 may employ machine learning model to automatically adjust the facial match threshold. In some implementations, the facial match threshold may tuned in a hybrid manner, that is, both manually and automatically. For instance, to account for certain machine learning models that may have the risk of teaching themselves incorrectly, certain implementations allow for manual adjustments to the facial match threshold as needed. For instance, if an incorrectly trained machine learning model sets the facial match threshold too low, which results in determining that different individuals depicted in the live facial image 152 and the photograph in the identity document 154 are the same person, such implementations allow a system administrator to manually increase the facial match threshold. In some examples, a machine learning model may be trained to suggest that the facial match threshold be dynamically altered based on variables such as varying image quality (e.g., high resolution selfie and low resolution photograph in the identity document), varying age of images (e.g., live selfie compared to old identity document), and varying image type (e.g., selfie captured from a different angle than that used in the identity document), and other variations (e.g., color selfie and use of grey scale photographs in some identity documents). In this way, the model may be trained to output facial match threshold suggestions based on any number of different facets. The machine learning model may also dynamically adjust the facial match threshold to account for variables such as poor image quality, dated identity documents (e.g., old identity documents), and the inability to determine a type of some identity documents (e.g., unknown type of photo ID used). In some implementations, the model may be trained to provide feedback or prompt a user when the facial match threshold cannot be met. For example, if a confidence level representing whether the individual in the live facial image 152 is the same person depicted in the photograph in the identity document 154 is too low (e.g., below the facial match threshold), the interactive display 114 could prompt the user to provide more data (e.g., "Try again (re-take selfie)," "Take a close-up," or the like) or alter the conditions (e.g., "turn on the lights," "take off your sunglasses" or the like).

Figure 6:
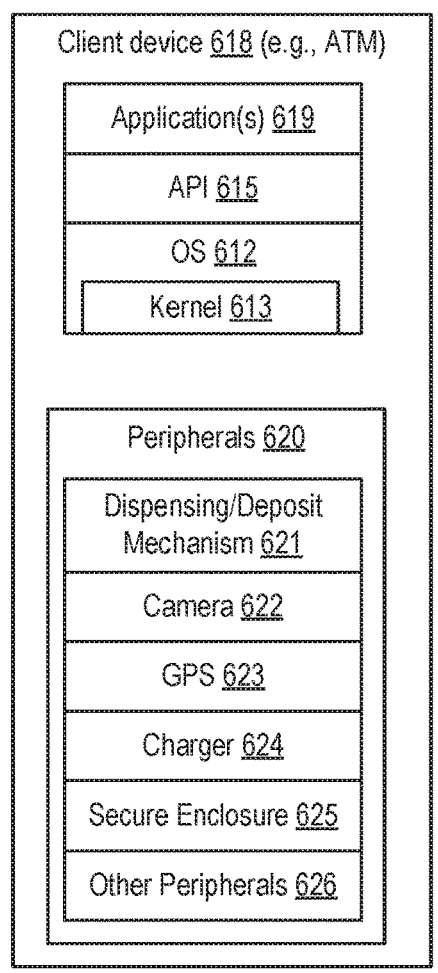
FIG. 6 is a block diagram illustrating an example of an automated teller machine (ATM) client device according to one or more implementations of the disclosure.

Peripheral(s) of the client device 118 may include components (e.g., I/O components) of the client device 118, some or all of which provide a user interface to the client device 118. In one example where the client device 118 is implemented as an ATM, peripherals may include ATM-specific peripherals, which are components that are typically not found on other types of devices (e.g., dispensing/deposit mechanism for cash and the like, card reader, etc. as shown in FIG. 6).

When performing operations, the client device 118 may interact with the identity verification server 102. The identity verification server 102 may be any type of online system, service or application such as a server, website, network-accessible API, etc. that is associated with the identity verification module 110 and the application 122 (e.g., enrollment application) on the client device 118. For example, the identity verification server 102 may be an online service that interacts with an enrollment application which is remotely accessed by the client device 118. For example, the online service may include a financial service, a government benefits service, school enrollment service, etc. In one implementation, the identity verification server 102 may be remote from the client device 118 (e.g., a separate system accessed via the network 115) and associated with the third-party providing the application 122. Accordingly, in one implementation, the client device 118 may be a kiosk, ATM, wall-mounted device, or table-mounted device associated (e.g., maintained by, provided by, owned by, etc.) with a financial entity or government entity and the identity verification server 102 may be associated (e.g., maintained by, provided by, owned by, etc.) with the third-party. As described, the identity verification service provided by the identity verification server 102 may have a corresponding application 122 (e.g., corresponding application available on an application store for various platforms) that is installed on the client device 118.

It should be noted that each of the systems described in environment 100 may include one or more systems (e.g., servers). For example, a database server(s) and a cloud-based storage system may form the identity verification server 102.

Figure 2:
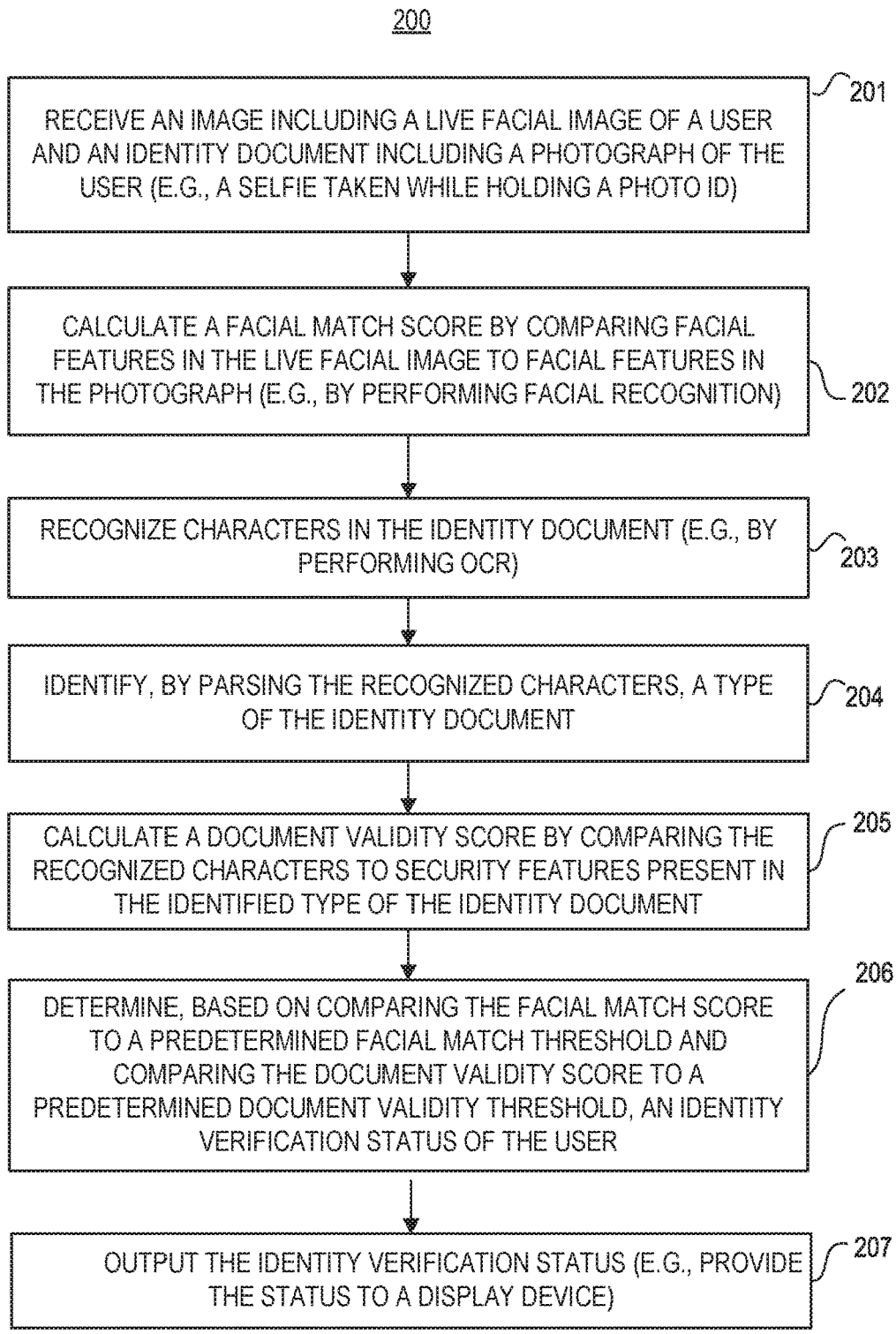
FIG. 2 is a process flow diagram illustrating an example of a process for verifying the identity of a user according to one or more implementations of the disclosure.

FIG. 2 is a process flow diagram illustrating an example of a process for verifying the identity of a user according to one or more implementations of the disclosure. Process 200 may use processing logic, which may include software, hardware, or a combination thereof. For example, process 200 may be performed by a system including one or more components described in the operating environment 100 of FIG. 1 (e.g., identity verification server 102 and client device 118).

In 201, the process (e.g., a process performed by a system such as the identity verification server 102) may receive an image (e.g., an image 150) including both a live facial image 152 of a user 116 and an identity document 154 that has a photograph of the user (e.g., a photo ID of the user). In one implementation, the image is captured by a camera of a client device 118 and transmitted via network 115. In some implementations, the image capture may be performed by an enrollment or account access application 122 available to all users of the client device 118. In additional or alternative implementations, the image capture may be performed by a conventional camera application that comes with a mobile phone client device 118, and the resulting image may be uploaded by a conventional browser that comes with the mobile phone to the identity verification server 102 via a website/web interface of the identity verification server 102. In such implementations, the phone would not need application 122 to be installed on it. Instead, the mobile phone client device 118 may just use its native capabilities.

In the example of FIG. 2, 201 may comprise receiving a selfie taken by a user while that user was holding a photo ID (e.g., visible in the frame of the selfie). However, the image may be captured by an ATM that provides an enrollment application to a specific user for the purpose of signing up the user for a new account. In certain implementations, 201 may be performed by the image processor 104.

In 202, the system may calculate a facial match score by comparing facial features in the live facial image to facial features in the photograph on the photo ID (identity document). In the example of FIG. 2, 202 may comprise performing facial recognition. For example, the system may use the image captured by the camera to perform the facial recognition and verify or determine a likelihood or probability that the person shown in the live facial image is the same person as is shown in the photo ID. In certain implementations, 202 may be performed by the facial recognition module 108.

At 203, the system may recognize characters in the identity document. In the example of FIG. 2, 203 may comprise performing OCR. In some implementations, such character recognition may be performed by the character recognition module 106. In an implementation, 203 may also comprise recognizing data objects such as character strings and graphical images present in the identity document. At 203, the system may use computer vision techniques to recognize data objects in addition to characters to detect security features present in the identity document. In some implementations, the recognized data objects include one or more of: a watermark; a hologram; a bar code; a serial number; a thumbnail version of the photograph; a negative image of the photograph; and a QR code. In some implementations, such object recognition may be performed by the image identification module 107.

At 204, the system may identify, by parsing the recognized characters and/or analyzing the data objects, a type of the identity document. For example, the system may determine that the identity document is a US passport based on the presence, form, and/or location of a hologram and watermark detected in the identity document. In some implementations, the parsed characters and detected data objects are compared to known identity document formats or configurations, such as predetermined character strings, data objects, and security features that are known to be present e.g., at specific locations, in specific types of identity documents (e.g., driver's licenses or ID cards issued by certain states or jurisdictions).

At 205, the system may calculate a document validity score by comparing the recognized characters and data objects to security features known to be present in the identified type of the identity document. For example, 205 may comprise calculating the document validity score as a percentage of data objects recognized or identified from the identity document, which has been determined to be a California driver's license, with respect to the entire set of data objects (e.g., identifiers, logos, seals images, data-bearing objects, and security features) known to be present in California driver's licenses.

At 206, the system may determine, based on comparing the facial match score to a predetermined facial match threshold and comparing the document validity score to a predetermined document validity threshold, an identity verification status of the user. The thresholds may be numeric values (e.g., percentages) that must be met before the system deems the identity document to be valid and the facial images (in the live facial image and photograph) to be a match. For example, the facial match threshold may be a percentage ranging from about 60% to 100%, such as 65%, 70%, 75%, or 80%, and the document validity threshold may be a percentage ranging from about 70% to 100%, such as 75%, 80%, 85%, or 90% In certain implementations, 206 may include a feedback loop whereby the user is prompted when the facial match threshold is not met. For instance, if a confidence level representing whether the individual in the live facial image 152 is the same person depicted in the photograph in the identity document 154 is too low (e.g., below the facial match threshold), 206 may include prompting the user via the interactive display 114 to provide more data (e.g., "Re-take selfie," "Take a close-up," or the like) or alter the conditions (e.g., "turn on the lights," "turn off flash", "take off your sunglasses", or the like).

In some implementations, the different percentages for the facial match threshold and the document validity threshold might be weighted differently and combined together to create an overall confidence level. For instance, one implementation may put a 66% weight on the facial recognition (e.g., 66% weight on the facial match threshold), and a 34% weight on the identity document validation (e.g., 34% weight on the document validity threshold). Also, for example, an alternative implementation may split the threshold percentages such that there is a 33% weight on the facial match threshold, a 33% weight on the document validity threshold and 34% weight spread across verification of secondary characteristics (e.g., name, address, date of birth, height, weight). In additional or alternative implementations, a weighted average may be used such that each threshold is required to exceed a certain level before an identity of a user is deemed to be verified. For example, such implementations may require a 60% confidence level to be met for all thresholds. According to this example, if the document validity threshold is not met (e.g., only a 10% confidence and the threshold is 60%) and the facial match threshold has been met or exceeded, the user's identity would be deemed to be unverified. In some implementations, 206 may be performed by the identity verification module 110.

In addition, in 206, the user's identity may be verified based at least in part on a combination of facial recognition as well as OCR from the identity document (e.g., ID card) to verify that the face of the user in the selfie matches the face shown in the photograph on the identity document. As another example, the user identity may be verified based at least in part on recognizing a name from the identity document using OCR, and verifying that the recognized name corresponds to a name associated with an existing or closed user account. For instance, the identity verification server 102 may access previously collected user information 112 for a particular user to assist in verifying that user's identity when signing up for a new account or new service.

At 207, the system may output the identity verification status. In the example of FIG. 2, 207 may comprise providing the status to a display device (e.g., the interactive display 114 of the client device 118).

Figure 3:
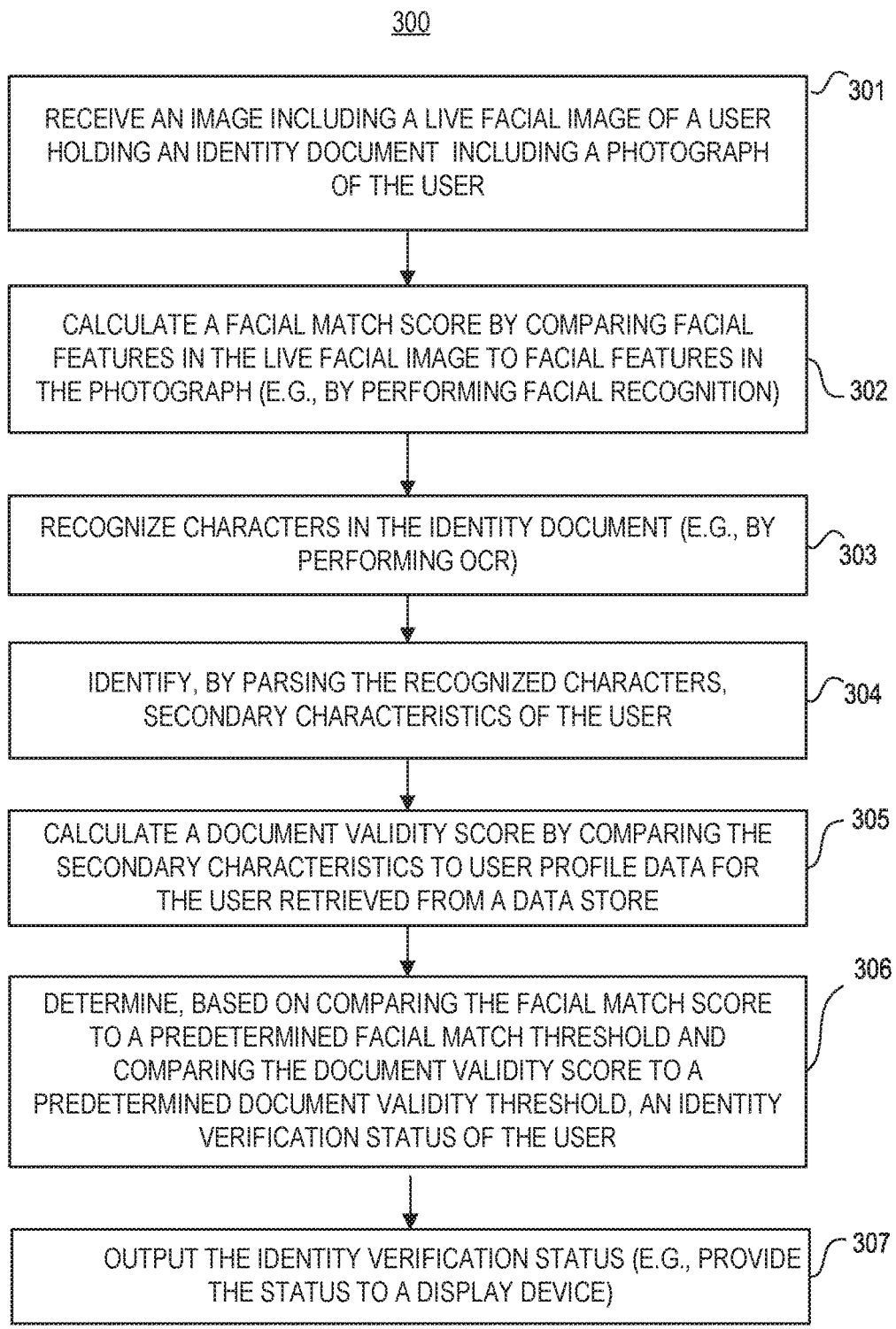
FIG. 3 is a process flow diagram illustrating another example of a process for verifying the identity of a user according to one or more implementations of the disclosure.

FIG. 3 is a process flow diagram illustrating an example of another process for verifying the identity of a user according to one or more implementations of the disclosure. Process 300 may use processing logic, which may include software, hardware, or a combination thereof. For example, process 300 may be performed by a system including one or more components described in operating environment 100 (e.g., identity verification server 102 and client device 118).

In 301, the process (e.g., a process performed by a system such as the identity verification server 102) may receive an image (e.g., the image 150) including a live facial image of a user who is holding an identity document that includes a photograph of the user. In one implementation, the image is captured by a camera of a client device 118 and transmitted via network 115. The image capture may be performed by an enrollment application 122 available to all users of the client device 118. In the example of FIG. 3, 301 may comprise receiving an image 150 including a selfie 152 taken by a user while that user was holding a photo ID 154 (e.g., visible in the frame of the selfie 152 taken by a mobile device). However, the image (e.g., the image 150) may be captured by a kiosk, wall-mounted device, or ATM or the like that provides an enrollment application to a specific user for the purpose of signing up the user for a new account. Such devices may provide a shelf or clip to mount the photo ID so that it is visible in the frame of the live facial image. Thus, it may not be necessary for the user to hold their photo ID while taking the selfie. In certain implementations, the image capture may be performed by an enrollment application 122 available to all users of the client device 118. In additional or alternative implementations, the image capture be performed by a conventional camera application that comes with a mobile communication device (e.g., smart phone) client device 118, and the resulting image may be uploaded by a conventional browser that comes with the smart phone to the identity verification server 102 via a website/web interface of the identity verification server 102. In such implementations, the smart phone would not need the application 122 to be installed or executing on it. Instead, the smart phone client device 118 may just use its native capabilities. In some implementations, 301 may be performed by the image processor 104.

In 302, the system may calculate a facial match score by comparing facial features in the live facial image to facial features in the photograph. In the example of FIG. 3, 302 may comprise performing facial recognition. For example, the system may use the image captured by the camera to perform the facial recognition and verify or determine a likelihood or probability that the person shown in the live facial image is the same person as is shown in the photo ID. In some implementations, 302 may be performed by the facial recognition module 108.

At 303, the system may recognize characters in the identity document. In the example of FIG. 3, 303 may comprise performing OCR. In an implementation, 303 may also comprise recognizing character strings present in the identity document. At 303, the system may use the character recognition module 106 to recognize to characters present in the identity document.

At 304, the system may identify, by parsing the recognized characters, secondary characteristics of the user indicated in the identity document. In various implementations, secondary characteristics are, or include, information from the identity document that describes, provides details or attributes regarding, or represents the user. For example, the system may determine that the identity document indicates secondary characteristics of the user including one or more of: an address; an account number; a driver's license number; a passport number; an employee number; a student identification number; a social security number; a national identification number; a name; a height, a weight, a gender, a date of birth, a nationality, an ethnicity, an expiration date of the identity document; a user status level; and a serial number of the identity document. In some implementations, the parsed characters are compared to known character strings present in specific types of identity documents (e.g., driver's licenses or ID cards issued by certain states or jurisdictions).

At 305, the system may calculate a document validity score by comparing the secondary characteristics to user profile data for the user retrieved from a data store. For example, 305 may comprise calculating the document validity score as a percentage of the secondary characteristics from the identity document that match with known secondary characteristics for that user, which were, for example, retrieved from previously collected user information 112. For example, 305 may comprise comparing the secondary characteristics from the identity document (e.g., date of birth and address from a driver's license) to known user characteristics retrieved from a database storing user profiles, account data, or other user information (e.g., date of birth and address from a bank account record).

At 306, the system may determine, based on comparing the facial match score to a predetermined facial match threshold and comparing the document validity score to a predetermined document validity threshold, an identity verification status of the user. The thresholds may be numeric values (e.g., numbers ranging from 1-10) that must be met before the system deems the identity document to be valid and the facial images (in the live facial image and photograph) to be a match. In some implementations, 306 may also include extracting, based on comparing the recognized characters to characteristics present in the identified type of the identity document, one or more user characteristics from the image, and then comparing the one or more user characteristics to the facial features in the live facial image and the facial features in the photograph. For instance, 306 may comprise comparing one or more characteristics present in the identified type of the identity document to extracted secondary user characteristics such as, for example hair color; eye color; gender, weight; height; date of birth; and ethnicity. Examples of using the extracted secondary user characteristics may include comparing the apparent age range of a person in in the live facial image 152, as determined by an algorithm, to an age indicated by a date of birth in the identity document 154; and comparing the fullness and size of the user's face in the live facial image 152 to the weight and height listed on the identity document 154. In some implementations, 306 may include detecting the user's height by relating the angle of the camera 120 (e.g., using a gyrometer or accelerometer in the user's mobile client device 118) with the live facial image 152.

Additional examples of using the extracted secondary user characteristics may include comparing the live facial image 152 to one or more of an age, height, weight, and ethnicity listed on the identity document 154. For instance, a machine learning model may be trained to recognize typical facial features (within a range) for a given height/weight combination in addition to or instead of using height and weight independently. Similarly, the machine learning model may be trained to recognize facial features typically found in combinations of age height, weight, and ethnicity. These example implementations may use an age that is determined from a date of birth listed on the identity document 154, an age retrieved from the previously collected user information 112, and other secondary user characteristics that are either read from text listed on the identity document 154 or that are retrieved from previously collected user information 112 (e.g., retrieved from a user account data store or a user profile database). Such implementations improve upon techniques that attempt to use secondary characteristics such as age, height, and weight independently. That is, by combining secondary characteristics, certain implementations create a range of standard facial contours and topographical maps for a given combinations of the characteristics.

According to example implementations, the facial match threshold used in 306 may be a percentage ranging from about 60% to 100%, such as 65%, 70%, 75%, or 80%, and the document validity threshold used in 306 may be a percentage ranging from about 70% to 100%, such as 75%, 80%, 85%, or 90%. As noted above with reference to operation 206 in FIG. 2, in certain implementations, the different percentages might be weighted differently and combined together to create an overall confidence level. For example, an implementation may put a 65% weight on the facial match threshold and a 35% weight on the document validity threshold. Further, for example, another implementation may split the threshold percentages such that there is a 34% weight on the facial match threshold, a 33% weight on the document validity threshold and 33% weight spread across verification of secondary characteristics such as name, address, age (i.e., based on date of birth), height, weight, and the like. In additional implementations, a weighted average may be used such that each threshold is required to exceed a certain level before an identity of a user is deemed to be verified. For instance, such implementations may require a 60% confidence level to be met for all thresholds. According to these examples, if the document validity threshold is not met (e.g., only a 50% confidence level in the identity document 154 being authentic and the threshold is 60%) and the facial match threshold has been exceeded, the user's identity would not be verified. In some implementations, 306 may be performed by the identity verification module 110.

At 307, the system may output the identity verification status. In the example of FIG. 3, 307 may comprise providing the status to a display device (e.g., the interactive display 114 of the client device 118 such as a mobile device's screen or an ATM screen).

Figure 4:
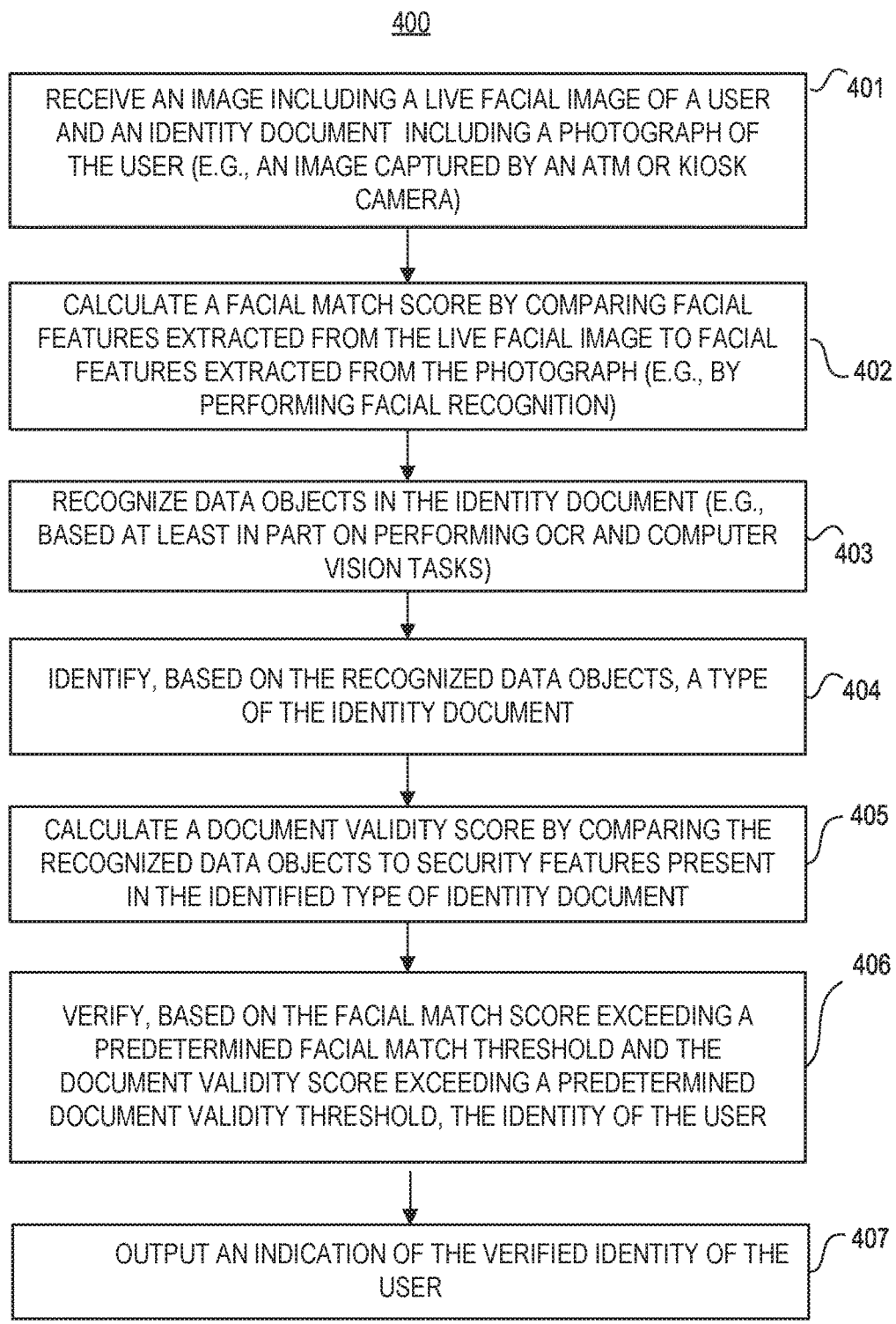
FIG. 4 is a process flow diagram illustrating yet another example of a process for verifying the identity of a user according to one or more implementations of the disclosure.

FIG. 4 is a process flow diagram illustrating an example of another process for verifying the identity of a user according to one or more implementations of the disclosure. Process 400 may use processing logic, which may include software, hardware, or a combination thereof. For example, process 400 may be performed by a system including one or more components described in operating environment 100 (e.g., identity verification server 102 and client device 118).

In 401, the process (e.g., a process performed by a system such as the identity verification server 102) may receive an image (e.g., the image 150) including a live facial image 152 of a user and an identity document 154 that includes a photograph of the user. In one implementation, the image is captured by a camera 120 of a client device 118 and transmitted via a network 115. In some implementations, the image capture may be performed by an enrollment application 122 available to all users of the client device 118. In some implementations of FIG. 4, 401 may comprise receiving a selfie taken by a user while that user was holding a photo ID in a manner that is visible in the frame of the selfie. In other implementations, however, the image may be captured by an ATM, or the like, that provides an interface to the enrollment application to a specific user for the purpose of signing up the user for a new account.

In 402, the system may calculate a facial match score by comparing facial features extracted from the live facial image to facial features extracted from the photograph on the identity document. In the example of FIG. 4, 402 may comprise performing facial recognition based on comparing the two sets of extracted facial features to each other in order to generate or determine a percentage or degree of matching between the two sets. For example, the facial recognition module 108 may perform 402 by using the image captured by the camera to extract respective sets of distinguishing facial features in order to perform facial recognition. In some implementations, 402 may be performed by the facial recognition module 108. According to some implementations, 402 may include using more than a single photo to calculate a facial match score. For example, 402 may calculate a facial match score based on multiple images 150 with multiple live facial images 152, or multiple images 150 included in video frames from a video recording.

At 403, the system may recognize data objects in the identity document. In the example of FIG. 4, 403 may include performing OCR and computer vision tasks. In some implementations, such character recognition may be performed by the character recognition module 106. In an implementation, 403 comprises recognizing, detecting, or identifying data objects such as character strings (e.g., words and phrases) and graphical images present in the identity document. At 403, the system recognizes data objects in order to detect information-bearing objects and security features present in the identity document. In some implementations, the recognized data objects include one or more of: a watermark; a hologram; a bar code; a serial number; a thumbnail version of the photograph; a negative image of the photograph; and a QR code. In certain implementations, such object recognition may be performed by the image identification module 107. Depending on the type of identity document used, not all data objects recognized in 403 will be security features. For example, a bar code, a serial number, and a QR code may have non-security functions. For instance, a bar code may simply indicate the user's name and address in a format that is scannable by a bar code reader.

At 404, the system may identify or determine, based on the recognized data objects, a type of the identity document. In various implementations, this may be determined based on the presence, form, and/or location of one or more data objects on the identity document—i.e., whether or not the identity document has or conforms with the expected data object(s), format or configuration of a specific type of document. For example, the system may determine that the identity document is a student ID based on the presence of a university seal watermark and a printed university logo detected on the identity document. In some implementations, the recognized characters and data objects are compared to character strings and security features that are known to be present in specific types of identity documents (e.g., student ID cards issued by certain schools and university systems).

At 405, the system may calculate a document validity score by comparing the recognized data objects to security features that are known to be present in the identified type of the identity document in order to generate or determine a percentage or degree of matching between the recognized data objects and the known security features. For instance, 405 may comprise calculating the document validity score as a percentage of data objects from the identity document, which has been determined to be a University of California Los Angeles (UCLA) student ID, that match the security features known to be present in UCLA student IDs.

At 406, the system may verify, based on the facial match score exceeding a predetermined, tunable, facial match threshold and the document validity score also exceeding a predetermined, tunable, document validity threshold, the identity of the user. In various implementations, the respective thresholds may be numeric values (e.g., percentages) that must be exceeded before the system deems the identity document to be valid and the facial images (in the live facial image and photograph) to be a match, and thus deem the identity of the user as being verified. For example, the facial match threshold may be a percentage ranging from about 60% to 100%, such as 85%, 90%, 95%, or 98%, and the document validity threshold may be a percentage ranging from about 70% to 100%, such as 90%, 94%, 96%, or 98%. As described above with reference to operation 206 in FIG. 2 and operation 306 in FIG. 3, according to some implementations, the different percentages for the thresholds may be weighted differently and combined together to create an overall confidence level. For example, 406 may comprise determining that the identity of the user is not verified in response to determining that a weighted combination of the facial match score and the document validity score is less than or equal to a weighted combination of the facial match threshold and the document validity threshold.

At 407, the system may output an indication of the verified identity of the user. In an implementation, 407 may comprise providing the indication to a display device (e.g., the interactive display 114 of the client device 118) to notify the user that their identity has been verified and that they may proceed with the enrollment process. In certain implementations, the indication may also indicate that the identity of the user has not and cannot be verified, and therefore that user should not be allowed to enroll or carry out a requested transaction.

Figure 5:
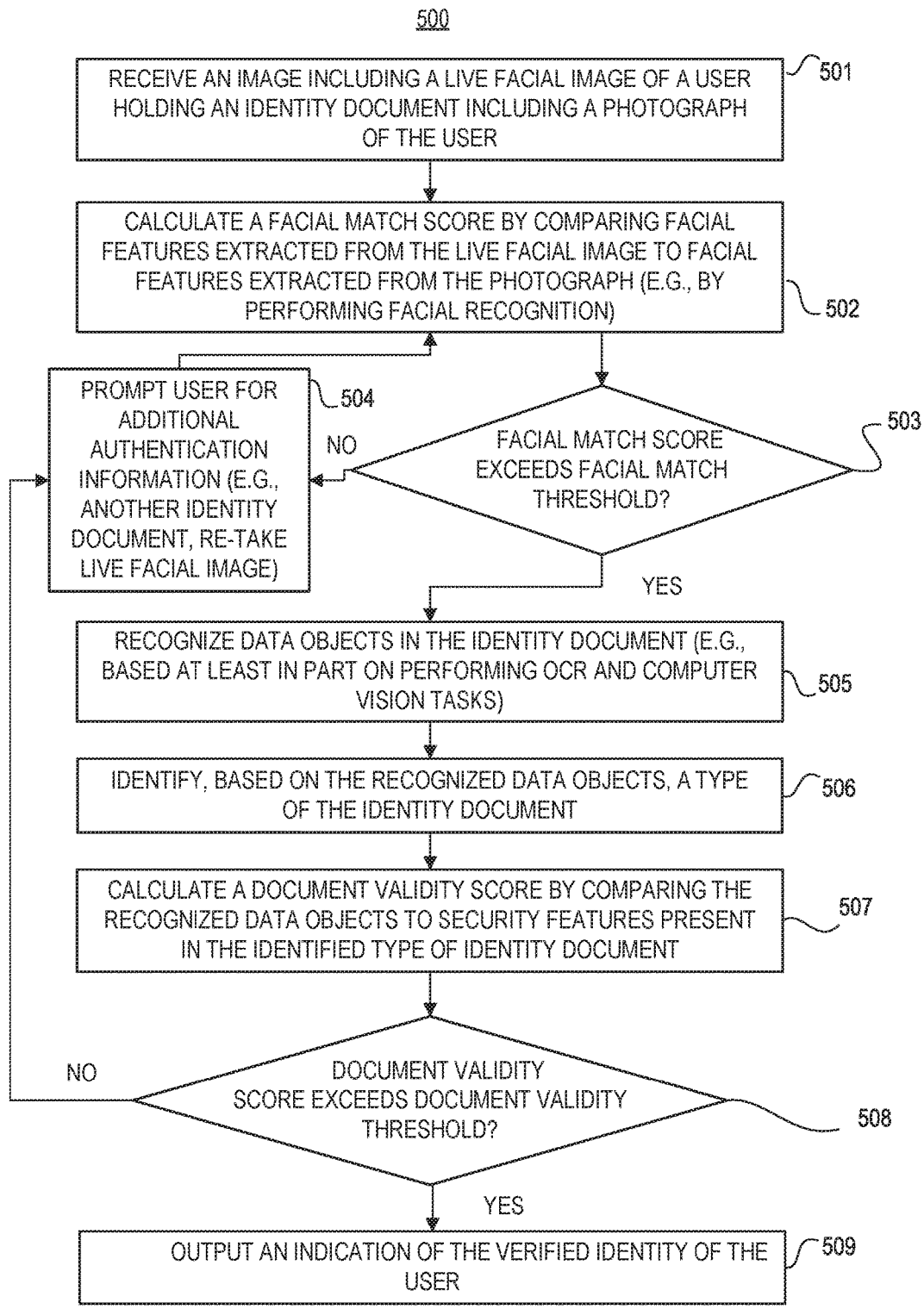
FIG. 5 is a process flow diagram illustrating an example of an interactive process for verifying the identity of a user according to one or more implementations of the disclosure.

FIG. 5 is a process flow diagram illustrating an example of an interactive process for verifying the identity of a user according to one or more implementations of the disclosure.

Process 500 may use processing logic, which may include software, hardware, or a combination thereof. For example, process 500 may be performed by a system including one or more components described in operating environment 100 (e.g., identity verification server 102 and client device 118).

In 501, the process (e.g., the system implementing the process 500, such as the identity verification server 102) may receive an image (e.g., image 150) including a live facial image of a user holding an identity document that has a photograph of the user. In one implementation, the image is captured by a camera 120 of a client device 118 and transmitted via a network 115. In some implementations, the image capture may be performed by an enrollment application available to all users of the client device 118. In the example of FIG. 5, 501 may comprise receiving a selfie taken by a user while that user was holding a photo ID in a manner such that the photo ID is visible in the frame of the selfie. In some implementations, 501 may be performed by the image processor 104.

In 502, the system may calculate a facial match score by comparing facial features extracted from the live facial image to facial features extracted from the photograph on the identity document. In the example of FIG. 5, 502 may comprise performing facial recognition based on comparing corresponding facial features in the two sets of extracted facial features to each other in order to generate or determine a percentage or degree of matching between the two sets. For example, the system may use the image captured by the camera to extract respective pairs of distinguishing nose, eye, chin and other facial features in order to perform facial recognition. In some implementations, 502 may be performed by the facial recognition module 108.

At 503, a determination is made as to whether the facial match score calculated at 502 exceeds a facial match threshold. In an implementation, 503 may comprise comparing the facial match score to a predetermined, tunable, facial match threshold (e.g., a percentage value). If it is determined that the facial match score exceeds the facial match threshold (503, YES), then control is passed to 505. Otherwise, if it is determined that the facial match score is less than or equal to the facial match threshold (503, NO), then control is passed to 504.

At 504, the user is prompted for additional authentication information. In the example of FIG. 5, 504 may comprise prompting, via an interactive user interface (e.g., interactive display 114), the user to take a picture of another identity document, (such as, a more recent or clearer identity document, or an identity document of a type that is stored in the system) and/or re-take the live facial image in order to improve the quality of the selfie for facial recognition purposes, and then control returns to 502 to act on the new facial image. In certain implementations, 504 may comprise providing feedback to the user via the interactive display 114 when the facial match score is less than or equal to the facial match threshold. For instance, when the facial match score is less than or equal to the facial match threshold, 504 may include prompting the user via the interactive display 114 to provide additional authentication information in the form of an improved image 150 (e.g., "Re-take photo/selfie," "zoom in/out", or the like) or alter the conditions (e.g., "change camera angle," "turn on/off flash", "remove your hat", or the like). In some implementations, 504 may comprise prompting the user for additional biometric data, such as, for example, a fingerprint scan, a voice recording (for voice recognition), or a retina scan. As another example, a near field communication (NFC) authentication may occur at 504 by verifying that a mobile device in possession of the user is associated with the user. According to this example, an existing user or customer may have previously-registered the mobile device with the identity verification server 102 so that the mobile device is associated with the user's account and NFC authentication may be used to determine that this particular, previously registered mobile device is being used to initiate a transaction. In some implementations, the system may utilize ATM-specific components (e.g., hardware such as a card reader for bank cards, credit cards, and the like) to provide an ATM authentication not available to other types of devices (e.g., a mobile device, or a generic computer).

At 505, after the facial match score exceeds the facial match threshold (503, YES), the system may recognize data objects in the identity document, for example, using a matching algorithm(s) and stored information about the appearance and/or characteristics of various data objects that are visible on various types of identity documents. In the example of FIG. 5, 505 may include performing OCR and computer vision tasks. In some implementations, the OCR may be performed by the character recognition module 106 and the computer vision tasks may be performed by the image processor 104 and the image identification module 107. In an implementation, 505 comprises recognizing data objects such as character strings (e.g., words and phrases) and graphical images present in the identity document. In some implementations, at 505, the system recognizes data objects in order to detect security features present in the identity document. In some implementations, the recognized data objects include one or more of: a watermark; a hologram; a bar code; a serial number; a thumbnail version of the photograph; a negative image of the photograph; and a QR code. In certain implementations, such object recognition may be performed by the image identification module 107.

At 506, the system may identify, based on the recognized data objects, a type of the identity document. For example, the system may determine that the identity document is a student ID from a specific university (e.g., the University of Virginia) because the system recognized both a university seal watermark and university logo for that specific university in the identity document. In some implementations, the recognized characters and data objects are compared to known security features present in specific types of identity documents (e.g., employee ID cards issued by certain employers) in order to identify the specific type of the identity document in the image (e.g., image 150).

At 507, the system may calculate a document validity score by comparing the recognized data objects to all of the data objects, including security features, known to be present in the identified type of the identity document. For instance, 507 may comprise calculating the document validity score as a ratio of the number of recognized data objects from the identity document, which has been determined to be a Capital One employee ID, with respect to the total number of data objects (e.g., data-bearing objects, character strings, and security features) known to be present in Capital One employee IDs, and this ratio may be expressed as a percentage. In additional or alternative implementations, 507 may comprise using weighted averages to calculate the document validity score, where different data objects (e.g., images such as logos, flags, and official/state seals) and security elements (e.g., holograms, watermarks, and the like) known to be present in the identified type of identity document are weighted differently.

At 508, the system may determine whether the document validity score calculated at 507 exceeds a document validity threshold. In an implementation, 508 may comprise comparing the document validity score to a predetermined, tunable, document validity threshold (e.g., a percentage value). If it is determined that the document validity score exceeds the document validity threshold, control is passed to 509. Otherwise, if it is determined that the document validity score is less than or equal to the document validity threshold, control is passed back to 504.

At 509, the system may output an indication of the verified identity of the user. In an implementation, 507 may comprise providing the indication to a display device (e.g., the interactive display 114 of the client device 118) to notify the user that their identity has been verified and that they may proceed with the account sign up process.

One of ordinary skill will recognize that the components, processes, data, operations, and implementation details shown in FIGS. 1-5 are examples presented for conciseness and clarity of explanation. Other components, processes, implementation details, and variations may be used without departing from the principles of the disclosure, and these example are not intended to be limiting as many variations are possible. For example, the operations (or methods, processes, etc.) shown and described above are not necessarily performed in the order indicated and may be performed in parallel. It should also be understood that the methods may include more or fewer operations than are indicated. In some implementations, operations described herein as separate operations may be combined. Conversely, what may be described herein as a single operation may be implemented in multiple operations.

FIG. 6 shows a block diagram of an example of a client device 618. In the example of FIG. 6, the client device 618 is an ATM (also known as an Automated Banking Machine (ABM)). The client device 618 may include variations of a self-service banking machine or kiosk. For example, in one implementation, the client device 618 may include a kiosk or device that may physically dispense or receive cash or other paper documents, such as checks and the like. To provide the functionality as further described herein, the client device 618 may include an operating system 612, which may be any type of suitable operating system or platform including a specialized operating system. In addition, the operating system 612 may include a kernel 613. The kernel 613 may handle various lower-level functions of the operating system 612 such as process, memory, and peripheral management. The kernel 613 may operate in a secure environment. For example, the kernel 613 may be stored in a secure memory (e.g., not accessible by application 619), and operate within a kernel space, whereas the application 619 may operate within an application/user space. The API 615 (Application Programming Interface) may include a set of protocols including routines, data structures, object classes, libraries, variables, etc. that provide a defined method of communication between the application 619 and components of the client device 618 including various peripherals 620. For example, an operation performed by the application 619 that requires communication with or access to one or more peripherals 620 of the ATM may only be available to the application 619 via the API 615. In another example, the application 619 may only be allowed to process and retrieve information related to a user account (e.g., financial information, user characteristics such as name and address, account enrollment information, etc.) via the API 615. In one implementation, the API 618 may be provided (e.g., developed) by a financial entity, which may be associated with the client device 618 (e.g., an API may be provided by Bank A, which provides a network of Bank A ATMs). In an example, the application 619 is an enrollment application for signing up a new customer. That is, the application 619 may use the camera 622 to capture an image (e.g., an image 150) that includes a live facial image 152 of the new customer and of an identity document 154 that includes a photograph of the new customer for the purposes of verifying the new customer's identity in order to sign the new customer up for an account or perform other functions that require pre-verification of the user's identity.

The peripheral(s) 620 may include components (e.g., I/O components) of the client device 618, some or all of which provide a user interface to the client device 618. In the example of FIG. 6 where the client device 618 is implemented as an ATM, peripherals 120 may include ATM-specific peripherals, which are components that are typically not found on other types of devices (e.g., dispensing/deposit mechanism, card reader, etc.) and ATM-specific functionality and capabilities (e.g., bank account access and control, credit account access and control, etc.). The peripherals 120 may include a cash or check dispensing/deposit mechanism 621 (which may include a separate dispensing and deposit mechanism), a camera 622, a GPS component 623 (or GPS data store), a charging mechanism 624, and a secure enclosure 625 of FIG. 6.

The secure enclosure 625 may include any type of container, compartment, box, locker, "mailbox" or "safety deposit box" type storage, etc., that may be suitable for the physical storage of various types of items. In one implementation, the secure enclosure 125 may part of a housing of the ATM. In another implementation, the secure enclosure 625 may be part of a separate housing (e.g., a separate housing, or wall), which may be at a remote location from the ATM. The secure enclosure 625 may be operatively coupled to the ATM. For example, a processor of the ATM may electronically lock or unlock the secure enclosure 625 for a particular user. In addition, the secure enclosure 625 may be temperature-controlled, humidity-controlled, etc., to provide an environment suitable to store various types of items. Such temperature and humidity control may be controlled from a remote system.

In addition, the peripherals 620 may also include various other peripherals 626 such as a biometric reader, touch screen that implements a graphical user interface, keypad, bank and credit card reader, USB key reader, receipt printer, and various other I/O (input/output) components.

Figure 7:
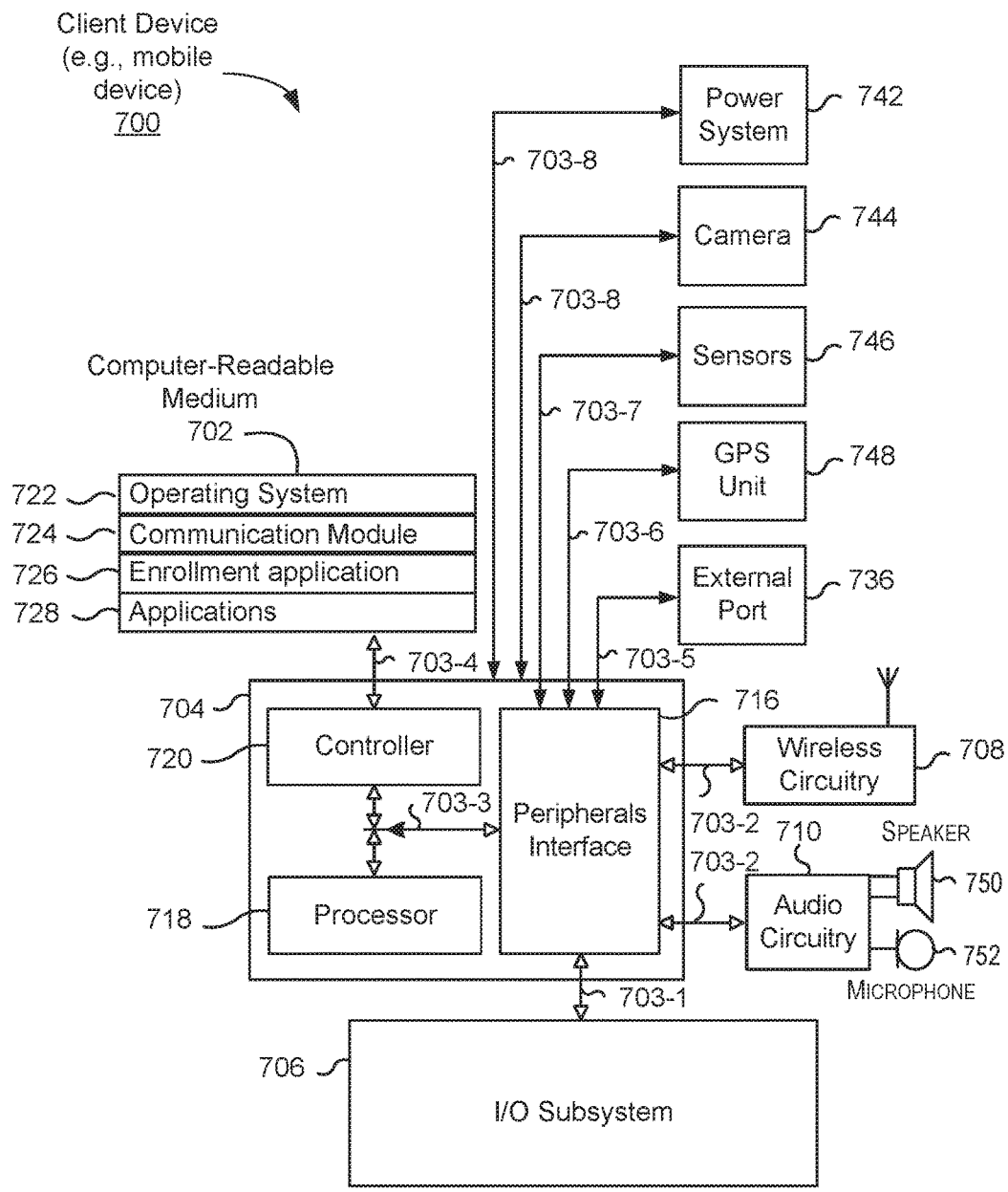
FIG. 7 is a block diagram illustrating an example of a mobile client device according to one or more implementations of the disclosure.

FIG. 7 shows a block diagram of another example of a client device 700. In the example of FIG. 7, the client device 700 is a mobile device. The client device 700, or mobile client device 700, generally includes computer-readable medium 702, a processing system 704, an Input/Output (I/O) subsystem 706, wireless circuitry 708, and audio circuitry 710 including speaker 750 and microphone 752. These components may be coupled by one or more communication buses or signal lines 703. Client device 700 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a vehicle display device, or the like, including a combination of two or more of these items.

It should be apparent that the architecture shown in FIG. 7 is only one example of an architecture for the client device 700, and that client device 700 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 708 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 708 can use various protocols, e.g., as described herein.

Wireless circuitry 708 is coupled to processing system 704 via peripherals interface 716. Interface 716 can include conventional components for establishing and maintaining communication between peripherals and processing system 704. Voice and data information received by wireless circuitry 708 (e.g., in speech recognition or voice command applications) is sent to one or more processors 718 via peripherals interface 716. One or more processors 718 are configurable to process various data formats for one or more application programs 728 stored on medium 702.

Peripherals interface 716 couple the input and output peripherals of the device to processor 718 and computer-readable medium 702. One or more processors 718 communicate with computer-readable medium 702 via a controller 720. Computer-readable medium 702 can be any device or medium that can store code and/or data for use by one or more processors 718. Medium 702 can include a memory hierarchy, including cache, main memory and secondary memory.

The mobile client device 700 also includes a power system 742 for powering the various hardware components. Power system 742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some implementations, the mobile client device 700 includes a camera 744. In some implementations, the mobile client device 700 includes sensors 746. Sensors can include accelerometers, compass, gyrometer, pressure sensors, audio sensors, light sensors, barometers, and the like. Sensors 746 can be used to sense location aspects, such as auditory or light signatures of a location.

In some implementations, the mobile client device 700 can include a GPS receiver, sometimes referred to as a GPS unit 748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 718 run various software components stored in medium 702 to perform various functions for the client device 700. In some implementations, the software components include an operating system 722, a communication module (or set of instructions) 724, an enrollment application (or set of instructions) 726, and other applications (or set of instructions) 728, such as a financial or online banking app.

Operating system 722 can be any suitable operating system, including a mobile operating system such as an Android or iOS operating system, LINUX, UNIX, OS X, WINDOWS, or an embedded operating system such as VxWorks. The operating system can include various procedures, a plurality of instructions, software components and/or drivers for controlling and managing general system tasks (e.g., memory management, storage device control, power management, etc.) and facilitates communication between various hardware and software components.

Communication module 724 facilitates communication with other devices over one or more external ports 736 or via wireless circuitry 708 and includes various software components for handling data received from wireless circuitry 708 and/or external port 736. External port 736 (e.g., USB, FireWire, Lightning connector, 60-pin connector, etc.) is adapted for coupling directly to other devices or indirectly over a network (e.g., the Internet, wireless LAN, etc.).

The enrollment application 726 can include various sub-modules or systems for capturing a live facial image (e.g., a selfie) of a user holding or otherwise presenting an identity document with the user's photograph. The enrollment application 726, in conjunction with the camera 744 and I/O subsystem 706 can be used to capture the image, prompt the user to re-take a selfie as needed (see, e.g., operation 504 of FIG. 5), and output an indication of the identity verification status of a user (see, e.g., operation 207 in FIG. 2).

The one or more applications 728 on the mobile device can include any applications installed on the client device 700, including without limitation, a browser, an address book, a contact list, email, instant messaging, video conferencing, video calling, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 706 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other implementations.

In some implementations, I/O subsystem 706 can include a display and user input devices such as a keyboard, mouse, and/or track pad. In some implementations, I/O subsystem 706 can include a touch-sensitive display. A touch-sensitive display can also accept input from the user based on haptic and/or tactile contact. In some implementations, a touch-sensitive display forms a touch-sensitive surface that accepts user input. The touch-sensitive display/surface (along with any associated modules and/or sets of instructions in medium 702) detects contact (and any movement or release of the contact) on the touch-sensitive display and converts the detected contact into interaction with user-interface objects, such as one or more soft keys, that are displayed on the touch screen when the contact occurs. In some implementations, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Figure 8:
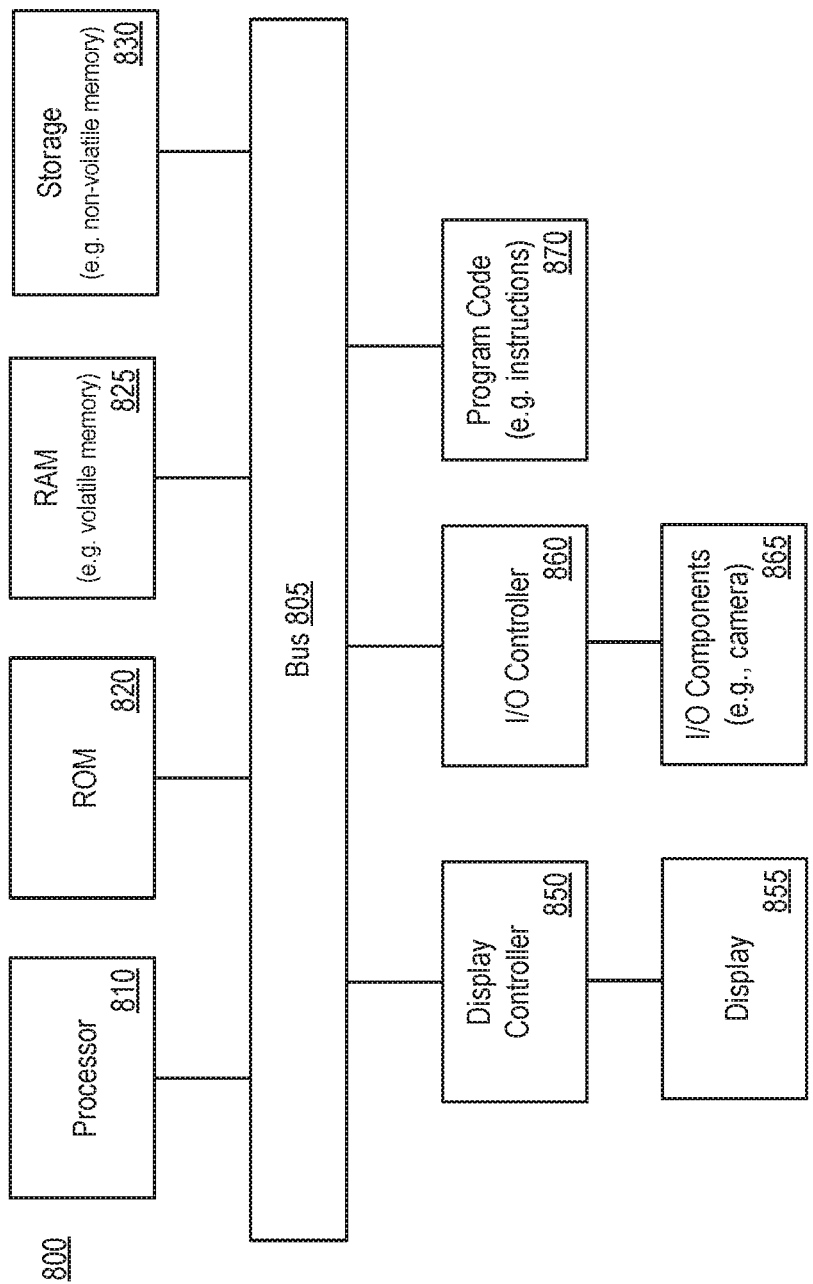
FIG. 8 is a block diagram illustrating an example of a computing system that may be used in conjunction with one or more implementations of the disclosure.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some implementations, in addition to the touch screen, the mobile client device 700 can include a touchpad (not shown) for activating or deactivating particular functions. In some implementations, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display FIG. 8 shows a block diagram of an example of a computing system that may be used in conjunction with one or more implementations. For example, computing system 800 (or system, or server, or computing device, or device) may represent any of the devices or systems (e.g., identity verification server 102, client device 118, ATM client device 618, mobile client device 700) described herein that perform any of the processes, operations, or methods of the disclosure. Note that while the computing system 800 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 800 may include a bus 805 which may be coupled to a processor 810, ROM (Read Only Memory) 820, RAM (or volatile memory) 825, and storage (or non-volatile memory) 830. The processor 810 may retrieve stored instructions from one or more of the memories 820, 825, and 830 and execute the instructions to perform processes, operations, or methods described herein. These memories represent examples of a non-transitory computer-readable medium (or machine-readable medium, or storage) containing instructions which when executed by a processor (or system, or computing system), cause the processor to perform operations, processes, or methods described herein. The RAM 825 may be implemented as, for example, dynamic RAM (DRAM), or other types of memory that require power continually in order to refresh or maintain the data in the memory. Storage 830 may include, for example, magnetic, semiconductor, tape, optical, removable, non-removable, and other types of storage that maintain data even after power is removed from the system. It should be appreciated that storage 830 may be remote from the system (e.g., accessible via a network).

A display controller 850 may be coupled to the bus 805 in order to receive display data to be displayed on a display device 855, which can display any one of the user interface features or implementations described herein and may be a local or a remote display device. The computing system 800 may also include one or more input/output (I/O) components 865 including mice, keyboards, touch screen, network interfaces, printers, speakers, and other devices. Typically, the input/output components 865 are coupled to the system through an input/output controller 860.

Program code 870 (or modules, instructions, components, subsystems, units, functions, or logic) may represent any of the instructions, operations, subsystems, or engines described above. Program code 870 may reside, completely or at least partially, within the memories described above (e.g., non-transitory computer-readable media), or within a processor during execution thereof by the computing system. In addition, program code 870 can be implemented as software, firmware, or functional circuitry within the computing system, or as combinations thereof.

Moreover, any of the disclosed implementations may be embodied in various types of hardware, software, firmware, and combinations thereof. For example, some techniques disclosed herein may be implemented, at least in part, by non-transitory computer-readable media that include program instructions, state information, etc., for performing various methods and operations described herein. Examples of program instructions include both machine code, such as produced by a compiler, and files containing higher-level or intermediate code that may be executed by a computing device such as a server or other data processing apparatus (or machine) using an interpreter.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other implementations of the invention will be apparent to those skilled in the art from consideration of the specification and practice of the invention disclosed herein. It is intended that the specification and examples be considered as examples only, with a true scope and spirit of the invention being indicated by the claims.

What is claimed is:

1. A method, implemented using a computer, for verifying an identity of a user, the method comprising:

receiving an image, the image including a live facial image of a user and an identity document that includes a photograph of the user;

initiating an identity verification process for the user, the identity verification process including:

calculating a facial match score by comparing facial features in the live facial image to facial features in the photograph;

recognizing data objects and characters in the identity document by performing optical character recognition (OCR) and computer vision tasks;

identifying, based on the recognized data objects and parsing the recognized characters, a type of the identity document; and calculating a document validity score by comparing the recognized characters and recognized data objects to character strings and data objects known to be present in the identified type of the identity document; and determining, based on comparing the facial match score to a predetermined facial match threshold and comparing the document validity score to a predetermined document validity threshold, an identity verification status of the user, wherein the identity verification status indicates that an identity of the user is not verified in response to determining that a weighted combination of the facial match score and the document validity score is less than or equal to a weighted combination of the facial match threshold and the document validity threshold; and outputting the identity verification status.

2. The method of claim 1, wherein calculating the facial match score comprises:

extracting a first set of facial features from the live facial image;

extracting a second set of facial features from the photograph;

comparing, using a facial recognition algorithm, the first set of facial features to the second set of facial features; and calculating the facial match score as a percentage of facial features in common between the live facial image and the photograph.

3. The method of claim 1, wherein:

outputting the identity verification status comprises presenting, on a display device, the identity verification status; and the identity verification status indicates that the identity of the user is verified in response to determining that:

the facial match score exceeds the facial match threshold; and the document validity score exceeds the document validity threshold.

4. The method of claim 1, wherein calculating the document validity score comprises:

comparing the recognized data objects to a watermark security feature present in the identified type of the identity document.

5. The method of claim 1, wherein determining the identity verification status of the user is further based on:

extracting, based on comparing the recognized characters to characteristics present in the identified type of the identity document, one or more secondary characteristics of the user from the image; and comparing the one or more secondary characteristics to the facial features in the live facial image and the facial features in the photograph.

6. The method of claim 5, wherein the characteristics present in the identified type of the identity document include one or more of: hair color; eye color; gender; weight; height; date of birth; and ethnicity.

7. The method of claim 5, wherein determining the identity verification status of the user is further based on:

comparing the one or more secondary characteristics to user profile data for the user retrieved from a data store.

8. The method of claim 1, wherein receiving the image comprises receiving the image from a camera, the image including the user holding the identity document that includes the photograph of the user.

9. The method of claim 8, wherein the camera is a camera of a mobile device.

10. The method of claim 8, wherein the camera is a camera of an automated teller machine (ATM).

11. A system for verifying an identity of a user, the system comprising:

one or more processors;
a display device; and a memory coupled to the one or more processors, the memory storing instructions, which when executed by the one or more processors, cause the one or more processors to perform operations comprising:

receiving an image, the image including a live facial image of a user and an identity document that includes a photograph of the user;

calculating a facial match score by comparing facial features in the live facial image to facial features in the photograph;

recognizing characters in the identity document by performing optical character recognition (OCR);

identifying, by parsing the recognized characters, secondary characteristics of the user;

calculating a document validity score by comparing the secondary characteristics to user profile data for the user retrieved from a data store;

determining, based on comparing the facial match score to a predetermined facial match threshold and comparing the document validity score to a predetermined document validity threshold, an identity verification status of the user; and presenting, on the display device, the identity verification status, wherein presenting the identity verification status comprises prompting the user to submit an additional image including another live facial image of the user holding the identity document in response to determining that the facial match score is below the facial match threshold.

12. The system of claim 11, wherein the secondary characteristics of the user include one or more of: an address; an account number; a driver's license number; a passport number; an employee number; a student identification number; a social security number; a national identification number; a name; a height; a weight; a date of birth; an ethnicity; an expiration date of the identity document; a user status level; and a serial number of the identity document.

13. The system of claim 11, wherein determining the identity verification status of the user further comprises comparing the secondary characteristics to the user profile data for the user retrieved from the data store.

14. The system of claim 11, wherein presenting the identity verification status comprises prompting the user to submit an additional image including another live facial image of the user holding another identity document in response to determining that the document validity score is below the document validity threshold.

15. A non-transitory computer-readable medium storing instructions which, when executed by one or more processors of a system, cause the system to perform operations comprising:

receiving an image from a camera of an automated teller machine (ATM), the image including a live facial image of a user holding an identity document that includes a photograph of the user;

calculating a facial match score by comparing facial features extracted from the live facial image to facial features extracted from the photograph;

recognizing data objects in the identity document based on performing optical character recognition (OCR) and computer vision tasks;

identifying, based on the recognized data objects, a type of the identity document; and calculating a document validity score by comparing the recognized data objects to security features present in the identified type of the identity document;

verifying, based on the facial match score exceeding a predetermined facial match threshold and the document validity score exceeding a predetermined document validity threshold, an identity of the user; and outputting an indication of the verified identity of the user.

16. The non-transitory computer-readable medium of claim 15, wherein the recognized data objects include one or more of: a watermark; a hologram; a bar code; a serial number; a thumbnail version of the photograph; a negative image of the photograph; and a Quick Response (QR) code.

17. The non-transitory computer-readable medium of claim 15, wherein verifying the identity of the user is further based on comparing the recognized data objects to user profile data for the user retrieved from a data store.

18. The system of claim 11, wherein receiving the image comprises receiving the image from a camera of an Automated Teller Machine (ATM).

19. The method of claim 1, wherein outputting the identity verification status comprises prompting the user to submit an additional image including another live facial image of the user holding the identity document in response the identity verification status indicating that the identity of the user is not verified.

20. The system of claim 11, wherein the identity verification status indicates that an identity of the user is not verified in response to determining that a weighted combination of the facial match score and the document validity score is less than or equal to a weighted combination of the facial match threshold and the document validity threshold.

* * * * *